Patented Dec. 29, 1925.

1,567,158

UNITED STATES PATENT OFFICE.

BERTRAM MAYER AND WILHELM MOSER, OF BASEL, SWITZERLAND, ASSIGNORS TO SOCIETY OF CHEMICAL INDUSTRY IN BASLE, OF BASEL, SWITZERLAND.

INDIGOID DYESTUFF OF THE ANTHRAQUINONE SERIES AND INTERMEDIATE PRODUCTS AND PROCESS OF MAKING SAME.

No Drawing.     Application filed November 18, 1924.   Serial No. 750,659.

*To all whom it may concern:*

Be it known that we, BERTRAM MAYER, a citizen of the Swiss Confederation, and WILHELM MOSER, a citizen of the German Republic, both residing at Basel, Switzerland, have invented new and useful Indigoid Dyestuffs of the Anthraquinone Series and Intermediate Products and Processes of Making Same, of which the following is a full, clear, and exact specification.

The present invention relates to new indigoid dyestuffs which are particularly valuable for the production of fast tints on the fibre. The invention comprises new intermediate products, new dyestuffs, the method of producing these compounds, as well as the material dyed with the new dyestuffs.

The dyestuffs derived from anthraquinone-2:3-indoxyl have not as yet been described.

It has been found that such compounds are obtained by condensing in a first step glycine with one molecular proportion of a 2-halogen-anthraquinone-3-carboxylic acid to produce the anthraquinone-2-glycine-3-carboxylic acid.

The compound thus obtained is treated in a second step with a suitable condensing agent, such as acetic anhydride and sodium acetate, whereby it is converted into indoxyl derivatives by ring closure.

In a third step these indoxyl derivatives are converted into dyestuffs by treatment with the usual and well known agents which convert indoxyl compounds into indigoid dyestuffs, i. e., oxidizing agents and compounds of the general formula

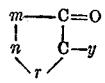

wherein $y$ represents reactive atoms such as O, halogen and radicals of the same degree of oxidation, and $m$, $n$ and $r$ represent atoms of which two are carbon atoms adjacent to each other which at the same time appertain to an aromatic ring system, and of which the third is a metalloid of the fourth to sixth group of the periodic classification of the elements.

Such compounds are for instance five-membered condensed ring systems, such as isatins and thioisatins of benzene, naphthalene, anthracene and anthraquinone series, acenaphthenequinones, and the like, their homologues and substitution products, anils and halides.

The dyestuffs thus obtained correspond to the general formula:

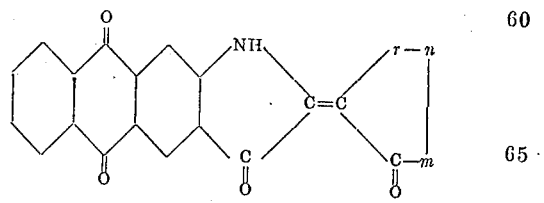

wherein $r$, $m$ and $n$ have the significations as has hereinbefore been defined.

These dyestuffs may further be converted into the corresponding halogenated dyestuffs by subsequent halogenation.

The new dyestuffs form dark powders which dissolve in concentrated sulphuric acid to blue to green-blue solutions, yielding with hydrosulphite and caustic soda solution, olive to red-brown and blackish-brown vats which dye cotton fast red-blue to blue-black and green tints.

The following examples illustrate the invention without limiting it, the parts being by weight:—

*Example 1.*—120 parts of 2-chloroanthraquinone-3-carboxylic acid, 60 parts of glycine, 40 parts of magnesium oxide, 2 parts of copper powder and 1400 parts of water are heated together for a long time at 120–130° C. After cooling, the mass is acidified with a mineral acid, filtered while hot and the solid matter dissolved in sodium carbonate solution; the anthraquinone-2-glycine-3-carboxylic acid is precipitated from the filtrate by acidification and is then filtered and dried.

It forms an orange powder, easily soluble in concentrated sulphuric acid to a deep orange solution, in alkalies to a red solution and in alkaline hydrosulphite solution to a wine red solution; it is very sparingly soluble in hot nitrobenzene or xylidine to a yellow orange solution.

*Example 2.*—29 parts of anthraquinone-2-glycine-3-carboxylic acid and 15 parts of anhydrous sodium acetate are boiled in 290 parts of acetic anhydride for some time in a reflux apparatus. A brown solution is produced, from which after a short time brownish yellow crystals separate. After cooling, these are filtered and washed first with glacial acetic acid and then with water and dried.

The compound thus obtained, which is probably a diacetyl-2:3-anthraquinoneindoxyl, forms brownish yellow crystals soluble in cold concentrated sulphuric acid to an orange-red solution, from which water precipitates the compound in the form of greenish yellow flocks. In nitro-benzene it dissolves to a yellow brown solution. With hydrosulphite and caustic soda solution it yields a vat which is at first brown and after some time passes to olive green.

*Example 3.*—10 parts of the compound obtained as described in Example 2 are ground wet and then boiled with 300 parts of caustic soda solution of 5 per cent strength. Air is led through the mixture until all dyestuff has separated in the form of black flocks. The dyestuff is then filtered, washed and dried.

It is probably the symmetrical 2:3-indigo of the anthraquinone series. It is a dark powder and dissolves in concentrated sulphuric acid to a blue-green solution from which it is precipitated by water in the form of grey-black flocks. With caustic soda solution and sodium hydrosulphite it yields an olive vat which dyes cotton pure blue green tints which are very fast to washing. The same dyestuff is obtained by dissolving the compound made as described in Example 2 in 10 times its weight of sulphuric acid of 98 per cent strength and heating the solution for one hour at 110–120° C. The original orange solution passes over to olive to bottle green. The mass is poured into water and the coloring matter filtered, washed and dried.

*Example 4.*—17 parts of the compound made as described in Example 2, 9 parts of isatin, 6 parts of sulphuric acid monohydrate and 150 parts of glacial acetic acid are boiled together for some time in a reflux apparatus. At first there is formed a brown solution from which there separates by degrees a blue crystalline body. The whole is allowed to cool and the precipitate filtered and dried.

The dyestuff thus obtained is a blue powder which dissolves in concentrated sulphuric acid to a bright green-blue solution. In nitrobenzene it is sparingly soluble to a wine red solution. With hydrosulphite and caustic soda solution it yields a blackish brown vat which dyes cotton blue-green tints. Similar products are obtained if a homologue or analogue of isatin is used instead of isatin, for example a thioisatin of the benzene or naphthalene series, or a chloride or anil thereof.

*Example 5.*—17 parts of the compound made as described in Example 2 are boiled together with 10 parts of acenaphthenequinone, 3 parts of sulphuric acid monohydrate and 150 parts of glacial acetic acid in a reflux apparatus. After a short time, separation of a blue violet crystalline condensation product begins. When the reaction is complete the whole is cooled, filtered and the solid matter washed and dried. The new dyestuff is a dark blue crystalline powder, soluble in sulphuric acid to a bright green blue solution and in hot nitrobenzene only sparingly to a wine red solution. With hydrosulphite and caustic soda solution it yields a brown red vat which dyes cotton very fast red-blue tints.

*Example 6.*—10 parts of the dyestuff made as described in Example 4, 150 parts of nitrobenzene and 15 parts of bromine, are heated together to boiling within 4 hours and boiled in a reflux apparatus for one hour. After cooling, the mixture is filtered and the solid matter washed with alcohol and then with water and dried. There is thus obtained a brominated dyestuff in the form of dark blue powder which dissolves in concentrated sulphuric acid to a pure blue solution, from which water precipitates it in the form of blue-violet flocks. With hydrosulphite and caustic soda solution a reddish brown vat is formed which dyes cotton fast blue green tints.

What we claim is:

1. As step in the production of new indigoid dyestuffs the herein described manufacture of anthraquinone-2-glycine-3-carboxylic acid, consisting in condensing glycine with 2-halogen-anthraquinone-3-carboxylic acid.

2. As step in the production of new indigoid dyestuffs the herein described manufacture of indoxyl compounds of the 2:3-anthraquinone series, consisting in condensing glycine with 2-halogen-anthraquinone-3-carboxylic acid and treating the anthraquinone-2-glycine-3-carboxylic acid thus obtainable with condensing agents.

3. The method of producing new indigoid dyestuffs, consisting in condensing glycine with 2-halogen-anthraquinone-3-carboxylic acid, treating the anthraquinone-3-carboxylic acid thus obtainable with condensing agents, and converting the indoxyl compounds of the 2:3-anthraquinone series thus obtainable into indigoid dyestuffs by treatment with the usual well known agents that convert the indoxyl compounds into indigoid dyestuffs.

4. The method of producing new indigoid dyestuffs, consisting in condensing glycine with 2-halogen-anthraquinone-3-carboxylic acid, treating the anthraquinone-3-carboxylic acid thus obtainable with condensing agents, converting the indoxyl compounds of the 2:3-anthraquinone series thus obtainable into indigoid dyestuffs by treatment with the usual well known agents that convert the indoxyl compounds into indigoid dyestuffs and treating the new indigoid dyestuffs with halogenating agents.

5. As new products the dyestuffs of the general formula:

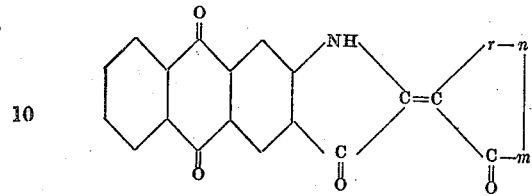

wherein $m$, $n$, and $r$ represent atoms of which two are carbon atoms adjacent to each other which at the same time appertain to an aromatic ring system, and of which the third is a metalloid of the fifth to sixth group of the periodic classification of the elements, which dyestuffs form dark powders, which dissolve in concentrated sulphuric acid to blue to green-blue solutions, yielding with hydrosulphite and caustic soda solution olive to red-brown and blackish-brown vats which dye cotton fast red-blue to blue-black and green tints.

6. As new product the symmetric indigo of the 2:3-anthraquinone series having the formula:

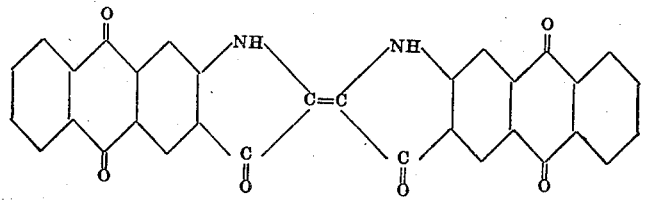

which is a dark powder, dissolving in concentrated sulphuric acid to a blue-green solution from which it is precipitated by water in the form of grey-black flocks, yielding with caustic soda solution and sodium hydrosulphite an olive vat which dyes cotton pure blue-green tints which are very fast to washing.

7. Material dyed with the dyestuffs of claim 5.

8. Material dyed with the dyestuffs of claim 6.

In witness whereof we have hereunto signed our names this 4th day of November, 1924.

BERTRAM MAYER.
WILHELM MOSER.